United States Patent [19]

Johnsen

[11] Patent Number: 5,184,447

[45] Date of Patent: Feb. 9, 1993

[54] BAG CLOSING MACHINE

[75] Inventor: Ole Johnsen, Campbellville, Canada

[73] Assignee: Johnsen Machine Company Limited, Burlington, Canada

[21] Appl. No.: 855,825

[22] Filed: Mar. 23, 1992

[51] Int. Cl.$^5$ ............................ B65B 51/20; B65B 51/18; B65B 7/06

[52] U.S. Cl. .................... 53/373.9; 53/374.3; 53/374.4; 156/87

[58] Field of Search ................ 53/373.9, 374.4, 374.5, 53/479; 156/87, 441.5

[56] References Cited

U.S. PATENT DOCUMENTS

| | | | |
|---|---|---|---|
| 3,286,433 | 11/1966 | Johnson et al. | 53/373.9 X |
| 3,315,439 | 4/1967 | Pierre | 53/374.5 |
| 3,488,244 | 1/1970 | Lepisto | 53/373.9 X |
| 3,606,727 | 9/1971 | Davis | 53/373.9 X |
| 3,720,565 | 3/1973 | Cavanna | 53/373.9 X |
| 3,914,917 | 10/1975 | Young | 53/374.4 X |
| 4,260,447 | 4/1981 | Muscariello | 53/374.4 X |
| 5,134,833 | 8/1992 | Lerner et al. | 53/373.9 X |

Primary Examiner—Horace M. Culver
Attorney, Agent, or Firm—Rogers & Scott

[57] ABSTRACT

A bag closing machine has a pair of endless belts mounted in a housing and having adjacent runs extending along a passage in the housing. The belts are driven to cause bags to be conveyed successively between the runs along the passage. A heating station adjacent the passage is operable to heat sealing areas of the bags to activate heat sealable material in a bag closing manner. The heating station has at least one pair of nozzles, one nozzle of each pair being on one side of the passage and the other nozzle of each pair being on the opposite side of the passage, the nozzles being directed towards the sealing area of a bag passing the heating station. Hot air is supplied to the nozzles to cause hot air to be emitted from the nozzles and impinge on the sealing area of a bag to activate the heat sealable material in a bag closing manner. When no bag is passing the heating station, hot air from the nozzles is removed to a location remote from the drive belts. The belts and associated parts may be mounted in respective separable portions of the machine to facilitate maintenance.

7 Claims, 5 Drawing Sheets

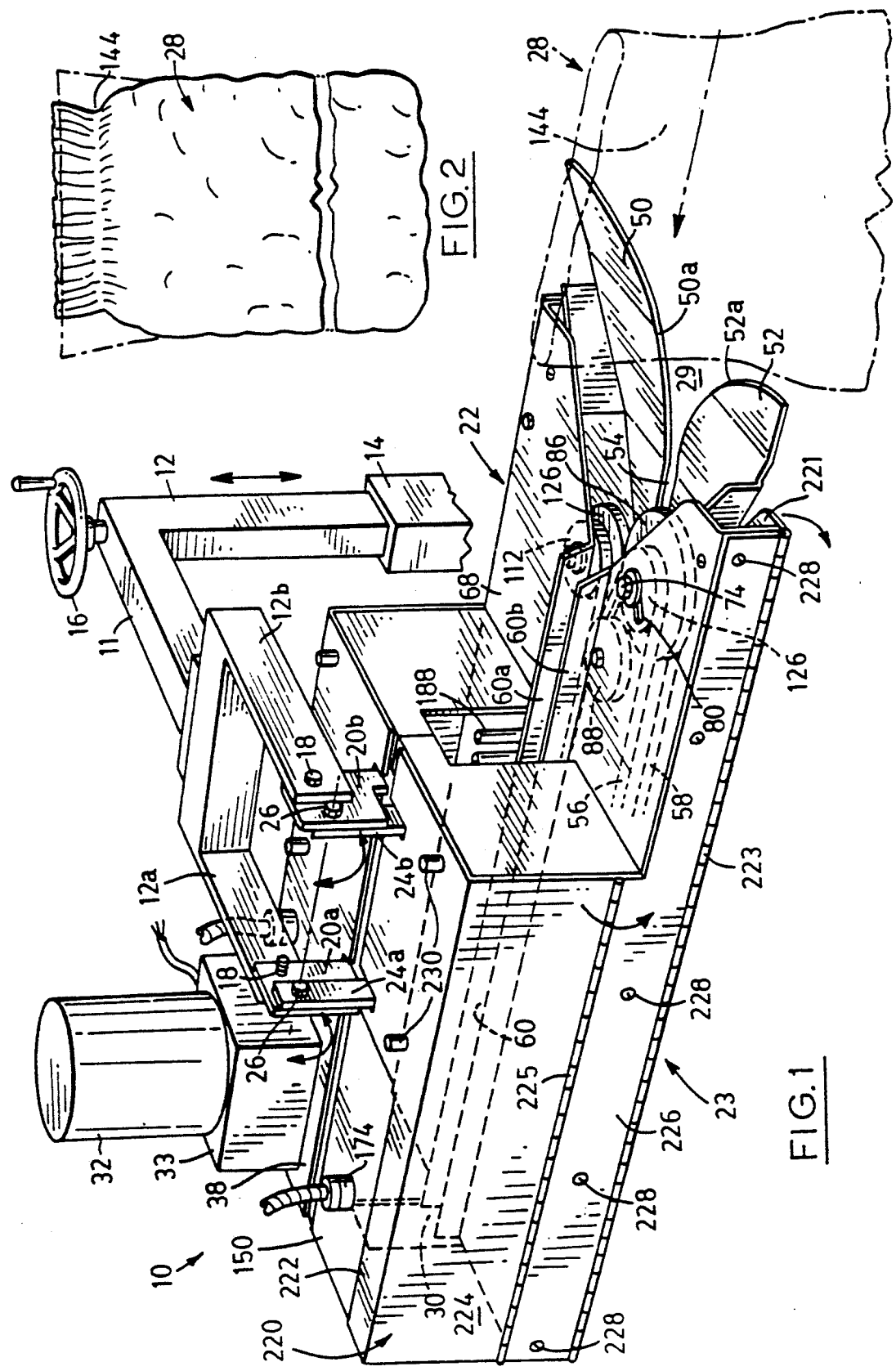

BAG CLOSING MACHINE

This invention relates to bag closing machines

It is known to close the tops of bags by heat sealing.

In prior machines for this purpose, problems have been encountered not only with being able to obtain access to parts of the machine for servicing but also with the damaging effect on other parts of the machine of the heat required in the heat sealing operation.

It is therefore an object of the invention to provide a bag closing machine for heat sealable bags which not only has parts readily accessible for servicing but which also incorporates means to dispose of at least some of the heat supplied in the bag sealing operation.

According to one aspect of the invention, a bag closing machine comprises a housing, a pair of endless belts mounted in the housing and having adjacent runs extending along a passage in the housing, means for driving the belts to cause bags to be conveyed successively between the runs along the passage, the bags having heat sealable material extending over a sealing area on open end portions of the bags and a heating station adjacent the passage and operable to heat the sealing areas of the bags to actuate the heat sealable material in a bag closing manner. The heating station has at least one pair of nozzles, one nozzle of each pair being on one side of the passage and directed towards the sealing area of a bags passing the heating station and the other nozzle of each pair being on the opposite side of the passage and directed towards the sealing area of a bag passing the heating station. Hot air is supplied to the nozzles to cause hot air to be emitted from the nozzles and impinge on the sealing area of a bag to activate the heat sealable material in a bag closing manner, and means are provided adjacent each nozzle for removing hot air emitted from the opposite nozzle when no bag is passing the heating station to a location remote from the drive belts.

The heat removing means may comprise a pipe surrounding each nozzle, each said pipe receiving hot air from a opposite nozzle when no bag is passing the heating station and conveying the hot air to a location remote from the drive belts.

Two pairs of endless belts may be provided, the first pair engaging a bag above the sealing area and the second pair engaging a bag below the sealing area.

According to another aspect of the invention, a bag closing machine comprises a housing having a first part and a second part movable relative to the first part, the first and second parts defining a passage therebetween, a pair of endless belts having adjacent runs extending along the passage, one endless belt of the pair being mounted on the first part of the housing and the other endless belt of the pair being mounted on the second part of the housing, means for driving the belts to cause bags to be conveyed successively between the runs along the passage, the bags having heat sealable material extending over a sealing area on open end portions of the bags, and a heating station adjacent the passage and operable to heat the sealing areas of the bags to actuate the heat sealable material in a bag closing manner. The heating station has at least one pair of nozzles, one nozzle of each pair being carried by the first part of the housing and being directed towards the sealing area on one side of a bag, and the other nozzle of each pair being carried by the second part of the housing and being directed towards the sealing area on the opposite side of the bag. The second part of the housing is movable relative to the first part to permit ease of access to the endless belts and the heating station.

The second part of the housing may be pivotally mounted on the first part and pivotable relative thereto to permit the ease of access.

An upper portion of the second part of the housing may be pivotally connected to an upper portion of the first part of the housing whereby the second part of the housing is pivotable upwardly relative to the first part to permit the ease of access.

The first part of the housing may comprise a first horizontal plate-like frame member below which said one endless belt and said one nozzle of each pair are mounted, and the second part of the housing may comprise a second horizontal plate-like frame member below which the other endless belt and the other nozzle are mounted.

One embodiment of the invention will now be described, by way of example, with reference to the accompanying drawings, of which:

FIG. 1 is a perspective view of a bag closing machine in accordance with one embodiment of the invention;

FIG. 2 is a side view of a bag showing how the open top portion of the bag is gathered before closing;

Figure 3:
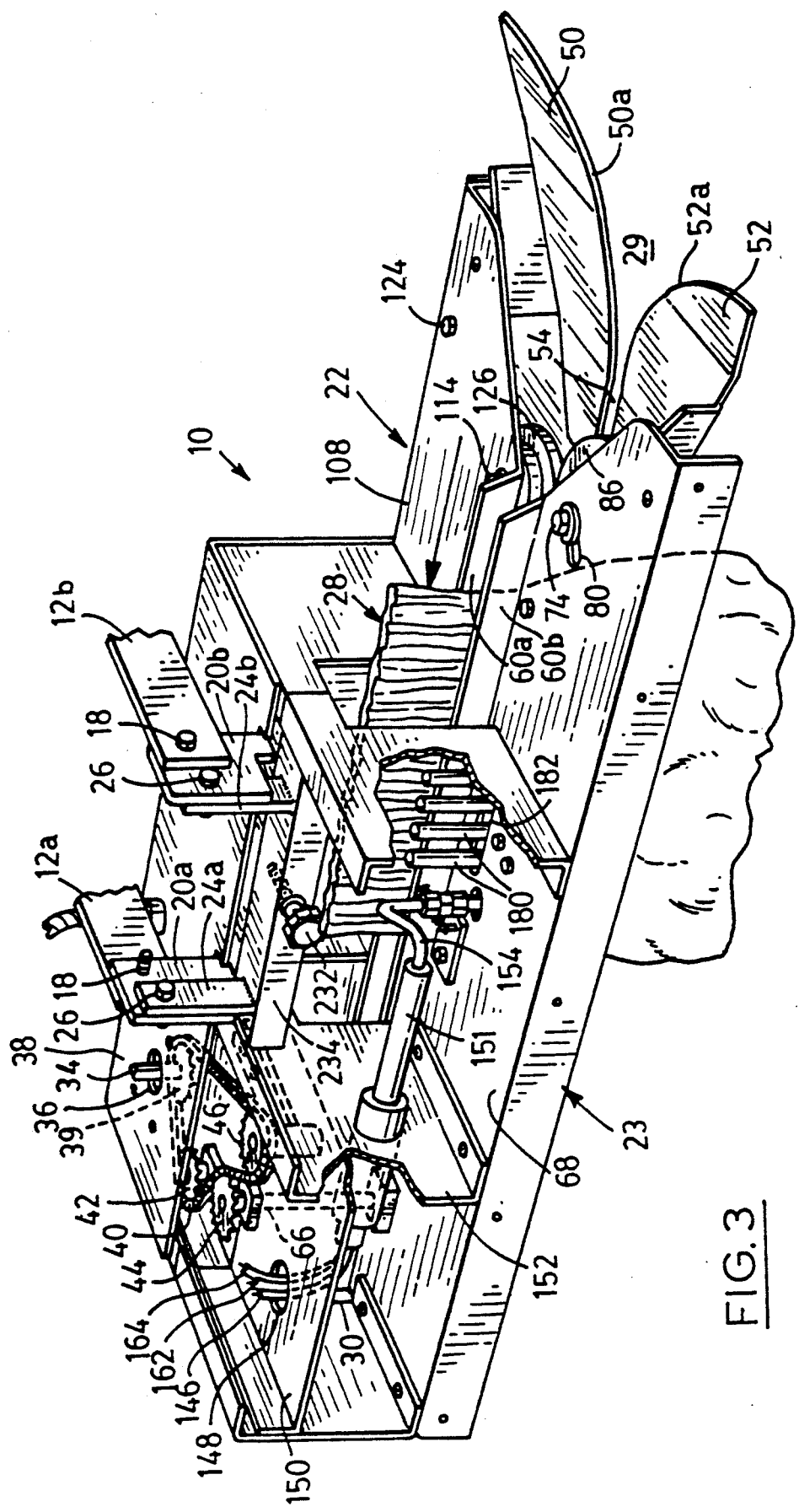
FIG. 3 is a perspective view of the bag closing machine of FIG. 1 but with the cover of the front part removed to show the manner in which the endless belts are driven and also to show parts associated with bag closure by hot air.

Referring to the drawings and with reference initially especially to FIGS. 1 and 2, a bag closing machine 10 is suspended from an arm 11 extending horizontally from the upper end of a post 12. The post 12 is telescopically mounted for vertical movement in a hollow post 14. Height adjustment wheel 16 at the top of post 12 is manually rotatable to adjust the vertical position of the post 12 relative to the post 14 and thereby adjust the height of the bag closing machine 10. The wheel 16 is connected to a mechanical height adjustment mechanism (not shown) within the post 14. Such mechanical height adjustment mechanism may be of any suitable construction as will be readily apparent to a person skilled in the art. It will be noted that the arm 12 has a U-shaped front end portion with forwardly-projecting laterally-spaced arm portions 12a, 12b, and that the bag closing machine 10 is suspended from the arm 12 by bolts 18 which extend through the arm portions 12a, 12b and through laterally-spaced vertical frame members 20a, 20b which extend upwardly from the main frame work of the machine.

The vertical frame members 20a, 20b extend upwardly from the rear part 22 of the machine as will be described in more detail later. The front part 23 of the machine has laterally-spaced vertical frame members 24a, 24b which are pivotally suspended from the upper end portions of frame members 20a, 20b by bolts 26 so that the front part 23 of the machine can be pivoted forwardly and upwardly away from the rear part 22 to enable access to the interior of the machine to be obtained. Bags 28 containing product and with open tops enter the machine sequentially through entry area 29 and leave through exit area 30.

The machine is driven by an electric motor 32 and gear box 33 mounted on the rear machine part 22 near the exit area 30. The gear box 33 has an output shaft 34 which extends downwardly from the gear box 33 through an aperture 34 in the top panel 36 of the rear machine part 22. Below the top panel 38, the shaft 34 carries a sprocket 29 around which a drive chain 40 passes. The drive chain 40 also passes around a pair of drive sprockets 42, 44 and an idler sprocket 46. For a reason which will become more apparent later, drive sprocket 42 and idler sprocket 46 are carried by mountings (not shown) secured to the rear part 22 of the machine and drive sprocket 44 is carried by a mounting in the front part 23 of the machine.

Referring now more specifically to FIG. 3, a bag 28 containing product enters the machine between guides 50, 52 in the entry area 29, with the product containing portion of the bag 28 below the guides 50, 52 and the upper end portion of the bag 28 which is to be closed above the guides 50, 52. The guides 50, 52 have convexly curved edges 50a, 52a which guide each bag 28 into a narrow passageway 54. The guides 50, 52 are curved upwardly in the direction in which the bag 28 enters so that, as the bag 28 travels below the edges 50a, 52a towards the passageway 54, its contents will be forced downwardly by the guides 50, 52 so as to ensure that the upper end portion of the bag 28 above the guides 50, 52 is not obstructed by product when the bag 28 reaches the passageway 54 and during the subsequent closing operation.

The front part 23 of the machine contains two vertically-spaced endless belts 56, 58 which pass around drive pulleys which will be described later. A run of each belt 56, 58 passes along a passage 60 between opposed wall 60a, 60b, i.e. between the front and rear parts 23, 22 of the machine. Similarly, the rear part 22 of the machine contains two vertically-spaced endless belts 62, 64 which pass around drive pulleys which will also be described later. A run of each belt 62, 64 also extends along the passage 60.

Figure 4:
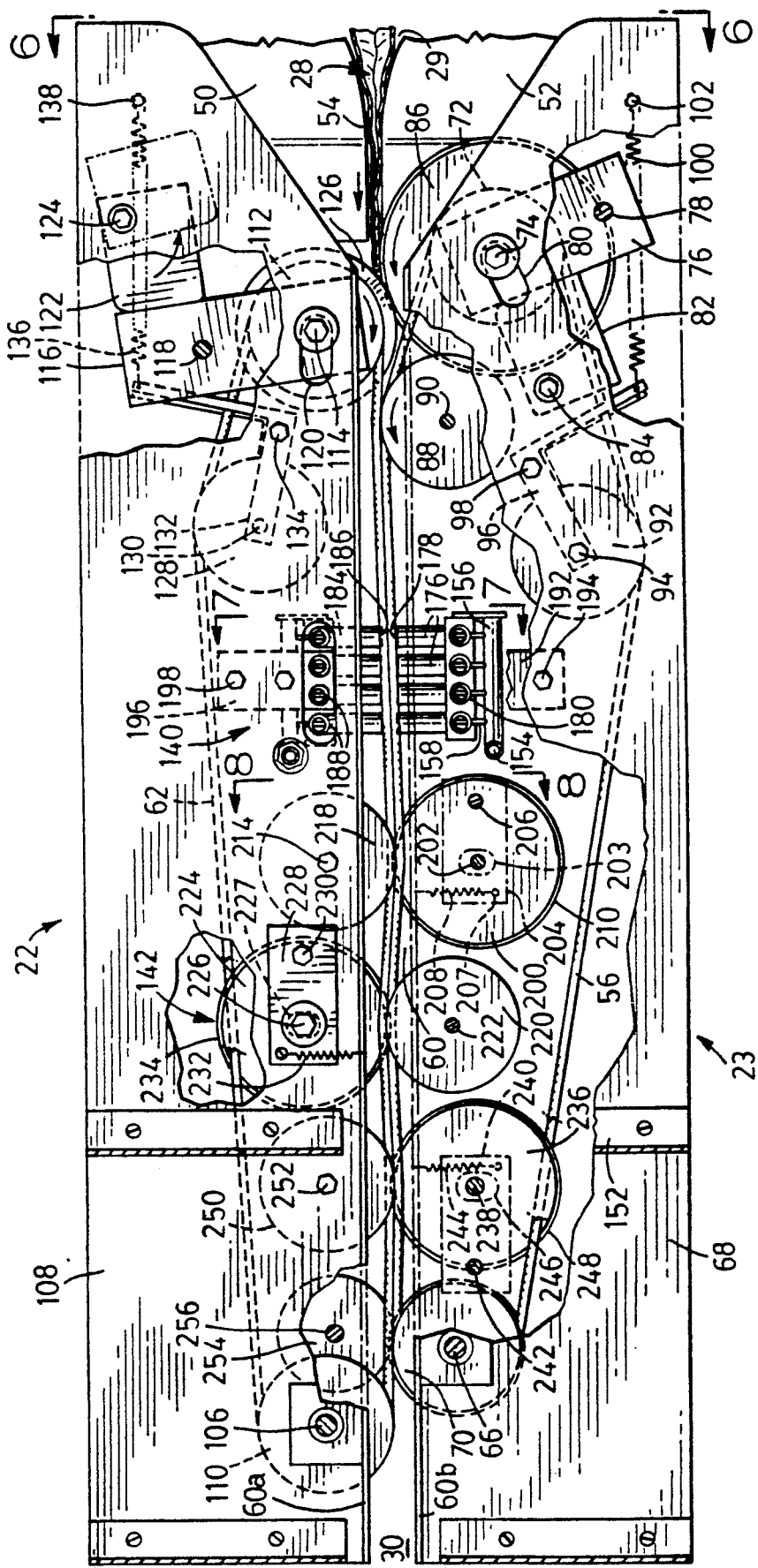
FIG. 4 is a diagrammatic plan view of the endless belt arrangement and heating station.

The various pulleys and rollers associated with the belts 56, 58 carried by the front part 23 of the machine will be described first. The drive sprocket 44 (FIG. 3), which is driven through chain drive 40 by electric motor 32 is carried by a drive shaft 66. The drive shaft 66 extends downwardly from drive sprocket 44 through a horizontal plate-like frame member 68 and, below the frame member 68, carries vertically-spaced drive pulleys 70 around which the belts 56, 58 respectively pass. It will be understood that FIG. 4 shows only the upper belt 56 and upper pulleys such as the upper pulley 70. The lower drive belt 58 and its associated pulleys are not shown in FIG. 4. It will be noted that drive shaft 66 and pulleys 70 are near the exit area 30 of the machine. The drive belts 56, 58 also pass around pulleys 72 located near the entry area 29 and mounted on a shaft 74.

The shaft 74 is carried by a mounting block 76 which is pivotally secured to the frame member 68 by a bolt 78, the shaft 74 being slidably movable in a slot 80 in the frame member 68. A tensioning block 82 is pivotally secured to the frame member 68 by a bolt 84 and, when in the position shown in FIG. 4, engages the mounting block 76 and retains it in a position such that the shaft 74 is at the right hand end of the slot 80 in FIG. 4, i.e. is in a position in which the pulleys 72 tension the drive belts 56, 58. The drive belts 56, 58 can be removed or replaced by pivoting the tensioning block 82 clockwise in FIG. 4 to permit shaft 74 to move to the left in slot 80 and slacken the belts 56, 58. A drive wheel 86 is mounted on the shaft 74 between the two pulleys 72. The drive wheel 86 has a larger diameter than the pulleys 72 and is engaged by the upper open end portion of a bag 28 as it enters the machine, as will be described in more detail later.

After passing around pulleys 72, the belts 56, 58 pass around idler 88 which is rotatbly mounted on a shaft 90 carried by frame member 68. Before passing around pulleys 72, belts 56, 58 pass two vertically-spaced tensioning rollers 92 which are rotatably mounted on a shaft 94 carried by a pair of vertically-spaced L-shaped levers 96 at the ends of one of their arms. The levers 96 are pivotally mounted at the junction of their arms on a bolt 98 carried by the frame member 68. Tensioning springs 100 are connected between the ends of the other arms of levers 96 and bolt 102 secured to the frame member 68. Springs 100 act through levers 96 and pulleys 92 to tension the belts 56, 58. The springs 100 are disconnected to remove tension in the belts 56, 58 before the retaining block 82 is pivoted to permit movement of the pulley shaft 74 as described above when it is desired to remove or replace the belts 56, 58.

The drive sprocket 42 carried by the rear part 22 of the machine and driven through chain drive 40 by electric motor 32 and and gear box 33 carries a drive shaft 106 which extends downwardly through a horizontal plate-like frame member 108 and, below frame member 108, carries vertically-spaced drive pulleys 110 around which the belt 62, 64 respectively pass. It will be understood that FIG. 4 shows only the upper belt 62 and upper pulleys, such as the upper pulley 110. The lower drive belt 64 and its associated pulleys are not shown in FIG. 4. Drive shaft 106 and pulleys 110 are near the exit end of the machine. Drive belt 62, 64 also pass around pulleys 112 located near the entry area 29 and are mounted on a shaft 114.

The shaft 114 is carried by a mounting block 116 which is pivotally secured to frame member 108 by a bolt 118, the shaft 104 being slidably movable in a slot 120 in the frame member 108. A tensioning block 122 is pivotally secured to the frame member 108 by a bolt 124 and, when in the position shown in FIG. 4, engages the mounting block 16 and retains it in a position such that shaft 114 is at the right hand end of slot 120 in FIG. 4, i.e. is in a position in which the pulleys 112 tension the belts 62, 64. The drive belts 62, 64, can be removed or replaced by pivoting the tension block 122 counter-clockwise in FIG. 4 (as shown in dotted outline) to permit shaft 114 to move to the left in slot 120 and slacken the belt 62, 64. A drive wheel 126 is mounted on the shaft 114 between the two pulleys 112. The drive shaft 126 has a slightly smaller diameter than the pulley 112. The drive wheel 126 has a rubber ring 127 mounted in a circumferential groove. The rubber ring 127 projects into a circumferential groove 87 in the drive wheel 86.

Before passing around pulleys 112, belts 62, 64 pass around two vertically-spaced tensioning rollers 128 rotatably mounted on a shaft 130 carried by two vertically spaced L-shaped levers 132 at the ends of one of their arms. The levers 132 are pivotally mounted at the junction of their arms on a bolt 134 carried by the frame member 108. Tension springs 136 are connected between the ends of the other arms of levers 132 and a bolt 138 carried by the frame member 108. Springs 136 act through levers 132 and rollers 128 to tension the bolts 62, 64. The springs 136 are disconnected to remove tension in the belts 62, 64 before the retaining block 122 is pivoted to permit movement of the pulley shaft 114 when it is desired to remove belts 62, 64.

Although the operation of the machine will be described in more detail later, it would be helpful at this stage to mention that a bag which is to be closed will arrive at the entry area 29, that its upper open end portion passes between drive rollers 86, 126 and is received between the belts 56, 62, and 58, 64 as they travel along the passage 60 between the front and rear parts 23, 22 of the machine. Before reaching the exit area 30, the belts 56, 62 and 58, 64 pass the upper open end portion of the bag 28 through a heating station 140 and a sealing station 142.

Figure 7:
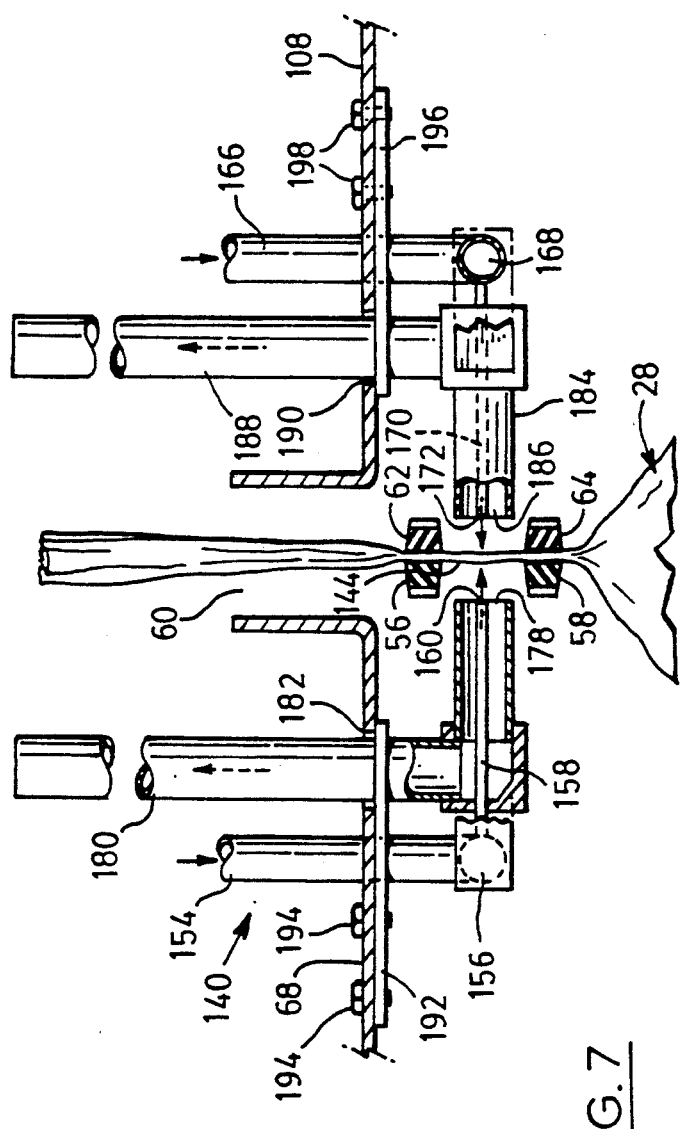
FIG. 7 is a sectional view taken along the line 7—7 of FIG. 4.

Referring now more particularly to FIGS. 3, 4 and 7, the heating station 140 directs jets of hot air at opposite sides of the portion 144 of the bag 29 (see FIG. 7) which is to be sealed as it travels through the heating station 140 between belts 56, 62 and 58, 64. As shown in FIG. 7, the sealing portion 144 of the bag 28 is positioned between the vertically-spaced belts 56, 62 and 58, 64. Air is supplied to the machine from any convenient source through a supply pipe 146 (see FIG. 1) which enters the machine through an aperture 148 in an upper cover portion 150 of the front part 24 (see FIG. 1). A supply pipe 146 passes air into an electric heater 151 carried by a partition 152 in the front part 23 of the machine and heated air from the heater 151 passes through a further supply pipe 154 downwardly through frame member 68 to a first manifold 156. From manifold 156, the heated air passes to four horizontal pipes 158 which are transversely spaced along passage 60 and terminate in nozzles 160 adjacent one side of the sealing portion 144 of a bag 28 passing through the station 160. Electric power for the heater 150 is supplied from a suitable power source through a cable 162 which passes through aperture 148.

A further supply pipe 164 supplies air to a heater (not shown) in the rear part 22 of the machine and heated air from the heater passes through a further supply pipe 166 to a second manifold 168. From the manifold 168 the heated air passes to four horizontal pipes 170 which are transversely spaced along passage 60 and terminate in nozzles 172 on the opposite side of the sealing portion 144 of a bag 28 to the nozzles 160. The electric cable 162 is also connected to the heater which supplies hot air to the nozzles 160. As will be seen in FIG. 1, air supply pipes 146, 164 and electric cable 162 are encased in a conduit 174 which is connected to the upper cover portion 150.

Each air supply pipe 158 is surrounded by an air outlet pipe 176 which has an open inlet end at 178 surrounding the respective nozzle 160. Each pipe 176 extends from its open end 178 to a vertical outlet pipe 180. Each outlet pipe 180 extends upwardly through a slot 182 in the frame member 68 to a height just above the sidewalls 60a, 60b of the passage 60. Similarly, each air supply pipe 170 is surrounded by an air outlet pipe 184 which has an open end 186 surrounding the respective nozzle 172. Each pipe 184 extends from its open end 186 to a vertical outlet pipe 188. Each outlet pipe 188 extends upwardly through a slot 190 in the frame member 108 to the same height as the outlet pipes 180.

The air inlet and outlet pipes 154 and 180 are supported by bracket 192 secured to frame member 68 by bolts 194, and the air inlet and outlet pipes 188, 166 are supported by a bracket 196 secured to the frame member 108 by bolts 198.

Beyond the heating station, the bag 28 and in particular the sealing portion 144 passes through sealing station 142 which comprises four pairs of pinch rollers between which the sealing portion 144 of the bag 28 sequentially passes while it is being transported along the passage 60 by belts 56, 62 and 58, 64. As shown especially in FIGS. 4 and 8, the first pair of pinch rollers comprises a roller 200 rotatable mounted on a shaft 202 carried by a tensioning block 204 pivotally secured by a bolt 206 to the frame member 68 and urged by a tension spring 208 into the passage 60. The tensioning spring 208 is connected between a bolt 209 on tensioning block 204 and passage sidewall 60a. The shaft 202 is movable in a slot 203 in frame member 68. A rubber ring 210 projects from a circumferential groove in the roller 200.

The first pair of pinch rollers also comprises a roller 212 rotatably mounted on a shaft 214 carried by frame member 108. The roller 212 has a circumferential groove 216 into which the rubber ring 210 on the roller 200 projects. The shaft 214 also carries two pulleys 218, one being above and the other being below the roller 212, which are engaged by the belts 62, 64 as they travel along the passage 60 to effect a small change in direction in the path of travel of the belt 62, 64 as can be seen in FIG. 4.

Figure 8:
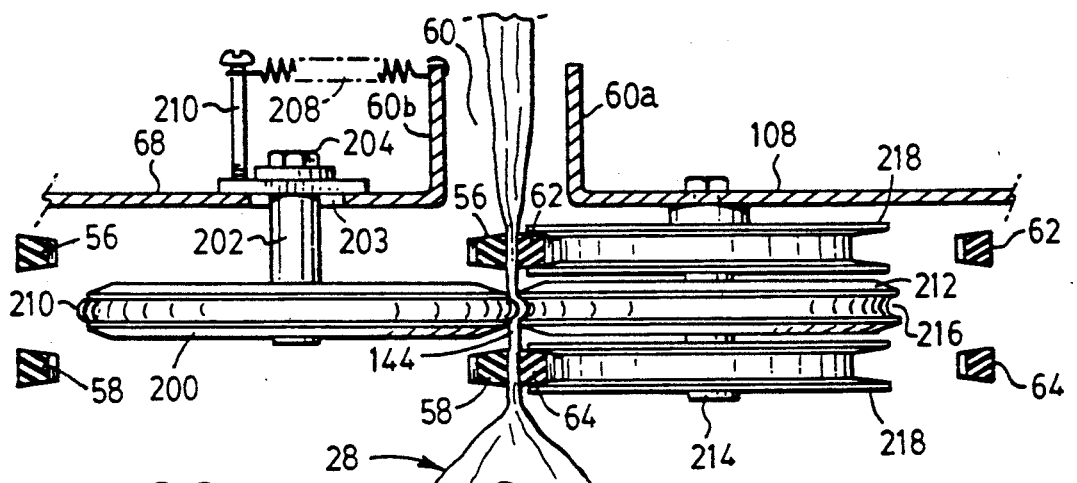
FIG. 8 is a sectional view taken along the line 8—8 of FIG. 4.

The second pair of pinch rollers is similar to the first pair except that the spring-tensioned roller is mounted on the frame member 108 (i.e. on the rear part 22 of the machine) and the roller/pulley combination is mounted on the frame member 68 (i.e. on the front part 23 of the machine). Apart from this difference, the arrangement of the second pair of pinch rollers is the same as that of the first pair of pinch rollers as shown in FIG. 8. The arrangement of the second pair of pinch rollers is thus as shown in FIG. 8 if reversed in the left to right sense. FIG. 4 shows that the second pair of pinch rollers comprises an upper pulley 220 rotatably mounted on a shaft 222 carried by the frame member 68, the pulley 220 being the equivalent of pulley 218 associated with the first pair of pinch rollers. Similarly, FIG. 4 also shows roller 224 rotatably mounted on shaft 226 carried by tension block 228 pivotally secured by a bolt 230 to the frame member 108 and urged by tension spring 232 into the passage 60. The shaft 226 is movable in a slot 227 in frame member 108. A rubber ring 234 projects from a circumferential groove in the roller 224 into a circumferential groove in a roller (not shown) below the pulley 220. As will be seen in FIG. 4, the pulleys 220 effect a slight change in direction of travel of the belts 56, 58 and 62, 64 as they travel along the passage 60, this change in direction being in the opposite sense to that produced by pulleys 218 associated with the first pair of pinch rollers.

The third pair of pinch rollers is similar to the first pair of pinch rollers, i.e. with the same arrangement as that shown in FIG. 8. FIG. 4 shows roller 236 rotatably mounted on a shaft 238 carried by tension block 240 which is pivotally secured by a bolt 242 to the frame member 68 and urged by a tension spring 244 into the passage 60. The shaft 238 is movable in a slot 246 in frame member 68. A rubber ring 248 projects from a circumferential groove in the roller 236. FIG. 4 also shows the upper pulley 250 rotatably mounted on a shaft 252 carried by the frame member 108. The rubber ring 248 projecting from roller 236 projects into a circumferential groove in a roller (not shown) below the pulley 250. It will be noted that the pulleys 250 effect a slight change in the direction of travel of the belts 56, 58 and 62, 64 as they travel along the passage 60.

The fourth pair of pinch rollers include a roller (not shown) rotatably mounted on shaft 66 between pulleys 70 and a grooved roller 254 rotatably mounted on shaft 256 carried by frame member 108. The roller mounted between pulleys 70 has a circumferential rubber ring which projects into the groove of roller 254.

In operation of the machine, filled but open bags 28 are fed one at a time in any convenient manner to the entry area 29 of the machine. It will be understood that the bags 28 will usually be travelling along a conveyor (not shown) which passes beneath the bag closing machine. The sealing portion 144 of each bag 28 is provided with heat sealing plastic material on its interior surfaces in known manner so that the bag 28 can be sealed by the application of heat and pressure to the sealing portion 114. At the entry area 29, each bag 28 passes between the guides 50, 52 which push the contents of the bag 28 downwardly away from the sealing area 114.

Figure 5:
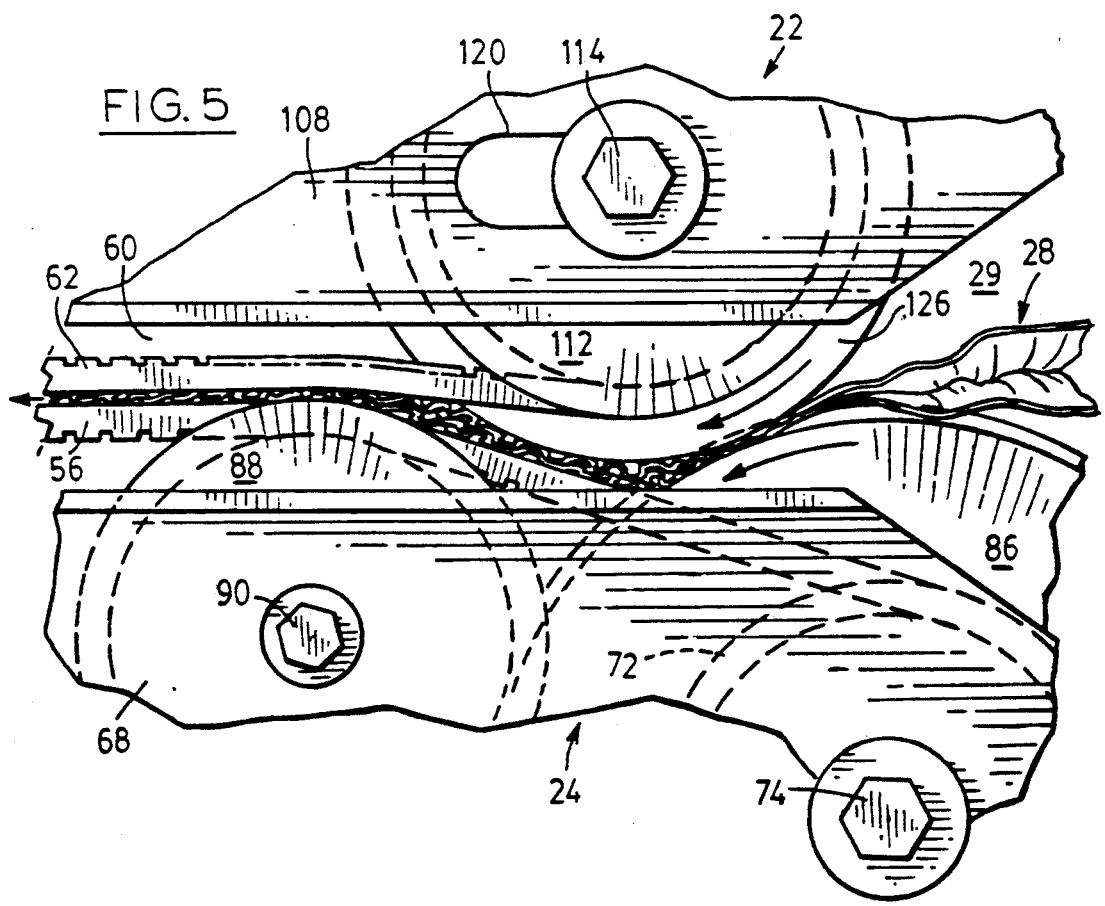
FIG. 5 is a diagrammatic plan view on an enlarged scale of the bag entry part of the machine showing how the open top portion of a bag is gathered before closing.

The sealing area 114 of each bag 28 then passes between rollers 86, 126 with rubber ring 127 on roller 126 firmly engaging the sealing area 114 and tending to force the sealing area 114 into the groove on roller 86. At the same time, the upper end portion of the bag 28 is held between the belts 56, 62 and 58, 64 above and below the sealing area 114 respectively as shown in FIG. 7. The passing of the sealing area 114 of the bag 28 between rollers 86, 126 causes the two sides of the bag to be brought into contact with each other. Also, the speed of the belts 56, 62 and 58, 64 is arranged to be slightly less than the circumferential speed of the rollers 86, 126, and in particular less than the circumferential speed of the larger diameter roller 86, so that the top of the bag 28 becomes slightly gathered as indicated in FIG. 2 where the gathered top portion is shown in full lines and the ungathered top portion is shown in dotted lines. The gathering step is shown more clearly in FIG. 5.

Figure 6:
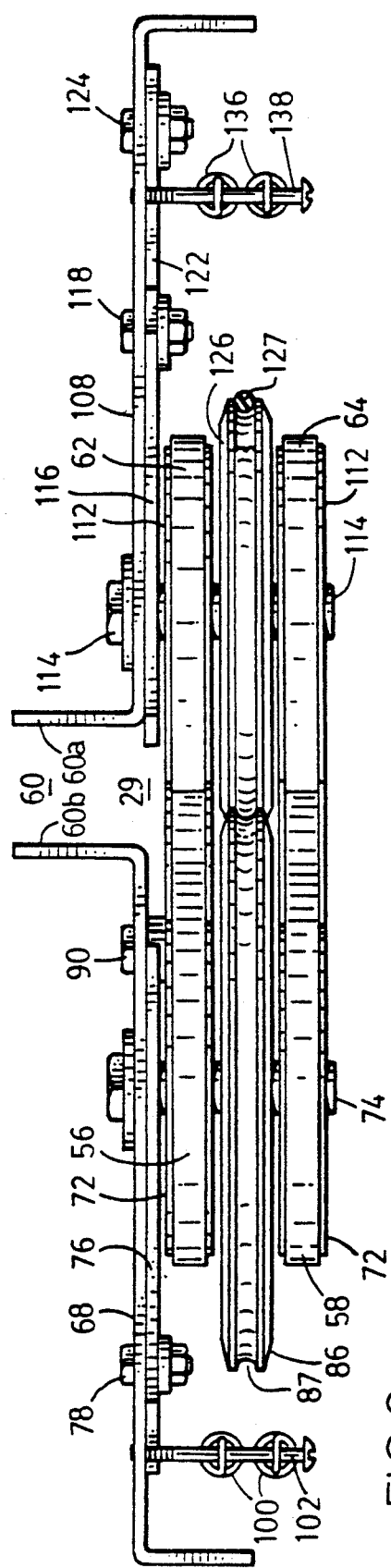
FIG. 6 is a sectional view taken along the line 6—6 of FIG. 4.

The bag then advances to the heating station 140. Referring now specially to FIG. 6, hot air impinges on opposite sides of the sealing portion 114 of the bag 28 on the four sets of nozzles 160, 172 to soften the heat sealing plastic material. The bag 28 then passes on to the sealing station 142 where it sequentially passes between the four sets of pinch roller to cause the two sides of the sealing area 114 of the bag to be forced against each other so that the softened heat sealing plastic material seals the bag 28. The grooved roller of each pair of pinch rollers, for example roller 212 of the first pair, acts as a heat sink to cool the plastic material. The sealed bag then leaves the machine at the exit area 30.

Referring again to FIG. 6, there are periods of time when no bag 28 is apssing through the heating station 140. At such times, much of the hot air from the nozzles 160 passes into the pipes 184 and then passes vertically upwardly through the pipes 188 to a location above the frame member 108. Similarly, hot from the nozzles 172 passes into the pipes 176 and then passes vertically upwardly through the pipes 180 to a location above the frame member 68. Thus, much of the hot air is vented from the area below the frame member 68, 108 where the belts 56, 58 and 62, 64 are located, thereby reducing the likelihood of hot air damaging the belts.

The machine can easily be serviced. As can be seen in FIG. 1, the left hand portion of the front part 23 of the machine has an upper cover 220 with a top portion 222 and a front wall portion 224 hinged at 225 to a front plate 226 secured by screws 228 to frame member 68. The cover 220 is held in the closed position by two fasteners 230. As shown in FIG. 3, the cover 220 can be opened and the previously mentioned cover portion 150 removed to gain ready access to the parts beneath the cover 220 and cover portion 150. The front part of the machine 23 also has a lower cover 221 hinged at 223 to the front plate 226 and secured in place by fasteners (not shown) under the machine similar to the fasteners 230.

The front part 23 of the machine is normally held in place by a bolt 232 which passes through a frame member 234 of the front part 23 into a threaded aperture in the rear part 22. Access to the belts 56, 58 and 62, 54 is easily effected by removing the bolt 232 and hinging the part 23 upwardly about hinge bolts 26. As can be seen from FIG. 3, during this movement, drive sprocket 4 simply moves away from drive chain 40. Also, the belts 56, 58 simply move away from belt 62, 64. Thus, the belts 56, 58 can readily be changed (in the manner previously mentioned) and other parts readily serviced. When belts 56, 58 are moved away from belt 62, 64, movement of roller 200 of the first pair of pinch rollers under the action of spring 208 is limited by shaft 202 engaging the end of associated slot 203. Similar remarks apply to the equivalent rollers in the second and third pairs of rollers.

As described above, the bags 28 have heat sealing plastic material on the interior surfaces of sealing portions 144. However, it will be readily understood by a person skilled in the art that the bags 28 may in fact be made of heat sealing plastic material.

Other embodiments of the invention will be clearly apparent to a person skilled in the art, the scope of the invention being defined in the appended claims.

I claim:

1. A bag closing machine comprising:
    a housing,
    a pair of endless belts mounted in said housing and having adjacent runs extending along a passage in said housing,
    means for driving said belts to cause bags to be conveyed successively between said runs along said passage, said bags having heat sealable material extending over a sealing area on open end portions of the bags,
    a heating station adjacent said passage and operable to heat the sealing areas of said bags to active said heat sealable material in a bag closing manner,
    said heating station having at least one pair of nozzles, one nozzle of each pair being on one side of said passage and directed towards the sealing area of a bag passing the heating station and the other nozzle of each pair being on the opposite side of said passage and directed towards the sealing area of a bag passing the heating station,
    means for supplying hot air to said nozzles to cause hot air to be emitted from the nozzles and impinge on the sealing area of a bag to activate said heat sealable material in a bag closing manner, and
    means adjacent each nozzle for removing hot air emitted from the opposite nozzle when no bag is passing the heating station to a location remote from said drive belts.

2. A bag closing machine according to claim 1 wherein said heat removing means comprises a pipe surrounding each nozzle, each said pipe receiving hot air from an opposite nozzle when no bag is passing the heating station and conveying said hot air to a location remote from said drive belts.

3. A bag closing machine according to claim 1 wherein two of said pairs of endless belts are provided, the first said pair engaging a bag above the sealing area and the second pair engaging a bag below the sealing area.

4. A bag closing machine comprising:
a housing having a first part and a second part, the first and second parts defining a passage therebetween,
a pair of endless belts having adjacent runs extending along the passage, one endless belt of the pair being mounted on the first part of the housing and the other endless belt of the pair being mounted on the second part of the housing,
means for driving said belts to cause bags to be conveyed successively between said runs along said passage, said bags having heat sealable material extending over a sealing area on open end portions of the bags,
a heating station adjacent said passage and operable to heat the sealing areas of the bags to activate said heat sealable material in a bag closing manner,
said heat station having at least one pair of nozzles, one nozzle of each pair being carried by the first part of the housing and being directed towards the sealing area on one side of the bag passing the heating station and the other nozzle of each pair being carried by the second part of the housing and being directed towards the sealing area on the opposite side of a bag,
said second part of the housing being movable relative to the first part to permit ease of access to said endless belts and said heating station.

5. A bag closing machine according to claim 4 wherein the second part of the housing is pivotally mounted on the first part and is pivotable relative thereto to permit said ease of access.

6. A bag closing machine according to claim 5 wherein an upper portion of the second part of the housing is pivotally connected to an upper portion of the first part of the housing whereby the second part of the housing is pivotable upwardly relative to the first part to permit said ease of access.

7. A bag closing machine according to claim 6 wherein the first part of the housing comprises a first horizontal plate-like frame member below which said one endless belt and said one nozzle of each pair are mounted, and the second part of the housing comprises a second horizontal plate-like frame member below which said other endless belt and said other nozzle are mounted.

* * * * *